United States Patent Office 3,539,597
Patented Nov. 10, 1970

3,539,597
β-ARYLATED NAPHTHOXIDINES AND A
METHOD OF PREPARATION
Hans Bosshard, Basel, and Werner Bossard, Riehen, Switzerland, assignors, by mesne assignments, to H. A. Whitten & Co., New York, N.Y., a partnership
No Drawing. Original application Jan. 19, 1966, Ser. No. 521,492, now Patent No. 3,338,659, dated Aug. 29, 1967. Divided and this application May 8, 1967, Ser. No. 645,089
Claims priority, application Switzerland, Nov. 15, 1961, 13,244/61
Int. Cl. C07c 49/66, 87/64
U.S. Cl. 260—396                                 21 Claims

ABSTRACT OF THE DISCLOSURE

Arylated naphthoxidines are produced by reacting a naphthoxidine of the formula

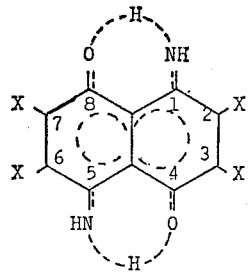

wherein each X represents hydrogen, chlorine, bromine, lower alkyl or phenylamino, at least one X being hydrogen and not more than one X being phenylamino with, per mol thereof, at least one mol of a diazonium salt of the formula $$[R-\overset{+}{N}{\equiv}N]A^-$$

wherein A⁻ is an anion and R is the radical of a mono- to bicyclic aromatic compound. According to the invention, end products having a further substituted naphthalene radical can be obtained by converting by reduction and/or oxidation, β-substituted, in particular halogenated naphthalene compounds having suitable substituents in at least two δ-positions, into naphthoxidines and then reacting these with diazonium compounds. The arylated naphthoxidines are useful in the dyeing of hydrophobic textile materials.

---

This application is a division of application Ser. No. 521,492, filed Jan. 19, 1966, now U.S. Pat. 3,338,659, which is in turn a continuation-in-part application of our copending applications Ser. No. 327,100, filed Nov. 29, 1963 and No. 440,918, filed Mar. 18, 1965 (both of which are now abandoned) which are in turn continuation-in-part applications of our patent application Ser. Nos. 237,755 and 237,760, both filed Nov. 14, 1962, the latter applications now being abandoned.

The invention concerns in a first aspect a process for the production of new naphthoxidines which are arylated at the central naphthalene ring, new compounds of the latter type and their use for the dyeing of textile fibers. It also concerns partcularly hydrophobic textile materials dyed with the new arylated naphthoxidines.

It has been found that new valuable arylated naphthoxidines are obtained by reacting compounds of the formula

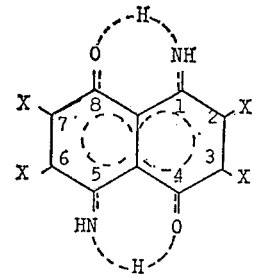

(I)

wherein each X represents independently from the others hydrogen, chlorine, bromine, lower alkyl or phenylamino, at least one X being hydrogen and not more than one X being phenylamino, with aromatic diazonium compounds, the resulting novel compounds, derivatives of the compounds of Formula I which are resonance hybrids, of which Formula I covers the limit electron configurations, as described by Ernest Merian in "Chemie der Aminonaphthochinone" (Chimia, 13, pages 181–212, (1959), and are referred to in this specification and the appended claims for the sake of brevity as "naphthoxidines." The compounds of Formula I may be further substituted at the naphthalene nucleus or at one of the nitrogen atoms and, moreover, one to three of the hydrogen atoms bound to the naphthalene nucleus, can be substituted as follows:

Naphthoxidines which are usable as starting materials in the process according to the invention can be further substituted at the napthalene nucleus in the 2-, 3-, 6- or 7-position and at the nitrogen atoms linked to the 1- or 5-position. Halogen atoms such as fluorine, chlorine or, preferably, bromine, lower alkyl groups such as methyl, ethyl, n-propyl, isopropyl groups and secondary or tertiary amino groups such as, e.g. phenylamino or N-lower alkyl-N-phenylamino groups can be present as substituents of the naphthalene nucleus. Substituents of the nitrogen atoms in the 1- and 5-position of the naphthalene ring can be hydrocarbon radicals which may be further substituted such as by lower alkyl or aryl groups, in particular phenyl, bromophenyl, chlorophenyl, lower alkylphenyl, and lower alkoxyphenyl groups.

The substitution of a free hydrogen atom, bound to the naphthalene nucleus of naphthoxidine, by the radicals of a diazonium salt with cleavage at the nitrogen of the $$-\overset{+}{N}{\equiv}N$$

group of the latter is very unexpected, for naphthalene derivatives such as 1-hydroxy-4-amino-naphthalene couple with diazonium salts with formation of an azo bridge —N=N—.

The naphthoxidines used as starting materials in the process of the invention fail to show the typical quinone reaction of, for instance, benzo- or naphthoquinone. Furthermore, the known arylated benzo- or naphthoquinones are relatively unstable due to their pronounced quinone character and are unsuited for use as dyestuffs.

Ring substituted arylated iminobenzoquinones and iminonaphthoquinones have never been produced prior to the present invention, to the best of our knowledge.

Aromatic diazonium compounds which are suitable as reactants in the process of the present invention are those of carbocyclic as well as those of heterocyclic, mono- or bicyclic radicals which retain their aromatic character even in strongly acid solutions, and are of the formula $$[R-\overset{+}{N}\equiv N]A^-  \quad (II)$$

wherein $A^-$ is a suitable anion such as $Cl^-$, $NO_3^-$, $SO_4^=$, $HCOO^-$ and the like. The nature of the anion is not critical.

R in the above formula is either one of the carbocyclic aromatic radicals with a benzene or a naphthalene nucleus, or one of the heterocyclic aromatic radicals with a ring system which retains its aromatic character even in strongly acid solution and the amino-substituted analog of which, i.e. $R-NH_2$, is diazotizable; R being preferably with a pyridine, quinoline, thiazole, benzothiazole, tetrazole, pyrazole, benzoxazole, thiadiazole, benzimidazole, indazole nucleus.

The carbocyclic or heterocyclic aromatic radicals R can contain one or more further substituents as desired and these may be ionogenic groups such as, e.g. the carboxyl or the sulfonic acid group or, preferably, non-ionogenic groups.

Examples of non-ionogenic substituents are: hydrocarbon groups such as methyl, ethyl or phenyl groups, ether groups such as methoxy, ethoxy, butoxy or phenoxy, chlorophenoxy, phenylthio groups, in particular, however, also electrophilic substituents which increase the reactivity of the diazonium group such as the nitro, cyano, trifluoromethyl group, azo, keto, carbocyclic acid ester, sulfonic acid ester, sulfonic acid amide, alkyl- or aryl-sulfonyl groups as well as, preferably the halogens fluorine, chlorine and bromine.

When R is a phenyl radical, this term means in the specification and appended claims the unsubstituted phenyl radical, as well as phenyl substituted as follows:

(I) Simple substituents (a) with one to five halogen atoms with atomic weight of maximally 80, i.e. chlorine, bromine and/or fluorine atoms;

(b) with one to three lower alkyl groups of maximally five and preferably one to two carbon atoms;

(c) with one to two alkoxy groups with maximally four carbon atoms;

(d) hydroxylated and halogenated (chlorinated or fluorinated) lower alkyl groups derived from those defined under (b) supra, especially trifluoromethyl, as well as lower alkoxy-alkyl groups having a total of maximally six carbon atoms;

(e) with one to two of the following radicals: nitro, cyano;

(f) —COOH or —$SO_3H$;

(g) two to three substituents in combination from one or several of the above listed groups;

(II) Carbonic acid ester radicals (a) alkoxycarbonyl with a total of 8 carbon atoms, (b) cyclohexyloxycarbonyl radicals and (c) benzyloxycarbonyl radicals which are either unsubstituted or substituted with methyl, chlorine, bromine, or nitro;

(d) combination of one substituent of (II)(a), (b) or (c), with one substituent of (I) (a) to (e), and preferably with nitro, one of the two substituents being preferably in 3- and the other in 4-position at the benzene radical of R;

(III) One sulfonic acid phenyl ester radical which is either unsubstituted or substituted with chlorine, bromine, nitro, or alkyl with maximally 5 carbon atoms;

(IV) One sulfone or one ketone radical namely either lower alkyl sulfonyl, or lower alkyl carbonyl, phenyl sulfonyl, chlorophenyl sulfonyl, lower alkyl phenyl sulfonyl, phenyl carbonyl, chlorophenyl carbonyl, or lower alkyl phenyl carbonyl, wherein lower alkyl has maximally four carbon atoms;

(V) One substituent of the formulas

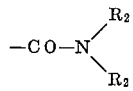

and

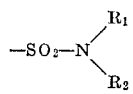

wherein $R_1$ is either hydrogen, or alkyl with maximally five carbon atoms, alkoxyalkyl with maximally six carbon atoms or hydroxyalkyl with maximally three carbon atoms, and $R_2$ is either hydrogen, or alkyl with maximally 5 carbon atoms, alkoxyalkyl with maximally 6 carbon atoms, hydroxyalkyl with maximally 3 carbon atoms, phenyl, lower alkylphenyl, chlorophenyl, and alkoxyphenyl with alkoxy of maximally 4 carbon atoms;

(VI) One sulfonylamino or carbonylamino substituent of the formula

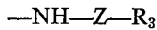

wherein

Z is either —$SO_2$— or —CO— and $R_3$ is either alkyl with maximally 4 carbon atoms or phenyl, alkyl phenyl, alkoxy phenyl, chlorophenyl, nitrophenyl, alkyl and alkoxy as substituents of phenyl meaning radicals of one to four carbon atoms, and when Z is —CO—, $R_3$ can also be alkoxy with 4 carbon atoms.

(VII) Phenyl, chlorophenyl, nitrophenyl, phenoxy, chlorophenoxy, nitrophenoxy, phenylthio, methylphenylthio, phenylazo, chlorophenylazo, bromophenylazo, lower alkylphenylazo, especially methylphenylazo, nitrophenylazo, hydroxyphenylazo and di-lower alkylaminophenylazo as substituents in the benzene nucleus of R.

(VIII) Combinations of one of substituents selected from the classes III to VII inclusive, with one to two of the substituents, selected from the group (I)(a) to (e).

When R is a naphthyl radical, this means unsubstituted naphthyl as well as naphthyl substituted with preferably one to two of the substituents chlorine, bromine, nitro, —$SO_3H$, —COOH, or sulfonamido or carbonamido as defined under (V) supra.

When R is a heterocyclic radical as described above, the latter can be either unsubstituted or substituted with alkyl with maximally 2 carbon atoms, alkoxy with maximally 4 carbon atoms, nitro, chlorine or bromine.

Suitable carbocyclic aromatic diazonium salts are, for example, those of aminobenzene, 1-amino-2-, -3- or -4-methylbenzene, 1-amino-2,5-, -2,4- or -3,4-dimethylbenzene, 1-amino-2-, -3- or -4-chlorobenzene, 1-amino-2-, -3- or -4-bromobenzene, 1-amino-2-, -3- or -4-fluorobenzene, 1-amino-2-methyl-4-chlorobenzene, 1-amino-2-methoxy-4 - chlorobenzene, 1 - amino - 2,4-, -2,5- or -3,4 - dichlorobenzene, 1-amino-2,4-, -2,5- or -3,4-dibromobenzene, 1-amino-2,4,5-trichloro- or -tribromo-benzene, 1-amino-3, 4,5-trichloro- or -tribromo-benzene, 1-amino-4-chloro-3-trifluoro-methylbenzene, 1-amino-2-, -3- or -4-nitrobenzene, 1-amino-4-methyl-3-nitrobenzene, 1-amino-2,5-dimethyl-4-nitrobenzene, 1 - amino-2-methoxy - 4 - nitrobenzene, 1-amino-2-chloro- or -bromo-4-nitrobenzene, 1-amino-4-chloro- or -bromo-2-nitrobenzene, 1-amino-2,5-dichloro- or -dibromo-4-nitrobenzene, 1-amino-2,3,5,6-tetrachloro- or -tetrabromo-benzene, 1- or 2-aminonaphthalene, 1-amino-5,8-dichloronaphthalene, 1-amino-4-nitronaphthalene, 2 - amino - 4 - chlorodiphenyl ether, 2-amino - 4,4' - dichlorodiphenyl ether, 3 - amino - 4 - chlorodiphenyl sulfone, 4-aminobenzene methyl- or acetyl-sulfone, 4-aminobenzene sulfamide, 3-aminobenzene-sulfodiethylamide, 4 - aminoazobenzene, 1 - amino-4-cyanobenzene, 4-amino-3,2'-dimethyl-azobenzene.

Suitable heterocyclic diabonium compounds are, for example, diazotized aminopyridines, aminoquinolines, 2-aminothiazoles such as 2-aminothiazoles, 2-amino-5-nitrothiazole, 2-aminobenzothiazole, 2-amino-6-methoxy-, -6-methyl-, -6-chloro- or -6-bromo-benzothiazole, 3-amino-tetrazole, 3-aminopyrazole, 2-aminobenzoxazole, 2-amino-thiodiazole (1,3,4), 5-methyl-2-aminothiodiazole (1,3,4), 5 - aminothiodiazole(1,2,4), 2 - or -6-aminobenzimidazole, 3- or 6-aminoindazole, 2-(4'-aminophenyl)-6-methyl-benzothiazole.

The napthoxidines which may be substituted as defined above, and which are suitable for use in the process according to the invention, are known or can be obtained by methods known per se, for example, from 1,5-dinitronaphthalenes substituted in the 2-, 3-, 6- or 7-position, by partial reduction with sulfur sesquioxide.

In the reaction according to the invention, from one ot two mols or even an excess over the latter amount, but preferably one mol of diazonium compound is caused to react with one mol of the starting naphthoxidine at a temperature within the range of —15° and 50° C., whereby an equivalent amount of nitrogen is split off and the aromatic radical corresponding to the diazonium compound enters at a free β-position of the naphthalene nucleus.

More than one, and preferably two diazonium salt radicals R can be introduced into the naphthalene nucleus of the starting naphthoxidines, if the radical R is an active, strongly negatively substituted radical with such negative substituents as those of groups (I)(e) and (f), (II), (III), (IV), (V), and also R with two to five of the halogen substitutes of (I)(a) supra.

According to the invention, end products having a further substituted naphthalene radical can be obtained by converting by reduction and/or oxidation, β-substituted, in particular halogenated naphthalene compounds having suitable substituents in at least two α-positions into naphthoxidines and then reacting these with diazonium compounds. However, unsubstituted naphthoxidines can also be treated by known methods with electrophilically substituting agents or they can be arylated at the nitrogen atom and then reacted with aryl diazonium compounds. Finally, the novel naphthoxidines arylated at the naphthalene nucleus by reaction with diazonium compounds can also be modified according to the invention, for example they can be electrophilically substituted and, particularly, halogenated at the naphthalene nucleus; they can also be hydrolyzed or arylated at the nitrogen atom.

The conditions for the reaction according to the invention can be modified within wide margins. Both water or aqueous mineral acid as well as inert organic solvents, preferably those having high solubilizing properties such as dioxan or dimethyl formamide can be used as reaction media. The naphthoxidines can be reacted both in their free form as well as in the form of a metal halide, e.g. metal chloride or metal bromide adduct. Zinc halide adducts, for example the easily isolated zinc chloride double salt of naphthoxidine can be used in an organic solvent; in the preferred method, the aqueous sulfuric acid solution or suspension of the naphthoxidine is used which results from the production of the "naphthazarine intermediate product" (see Merian supra) in the usual way from 1,5-dinitronaphthalene.

The temperature and duration of the reaction depend to a considerable extent on the nature of the diazonium compound used. Generally, active electrophilically substituted diazonium compounds react considerably more quickly than the less active nucleophilically substituted aryl diazonium compounds. As mentioned above, the reaction takes place in a temperature range between —15° and 50° C. and higher, but without causing hydrolization of the desired end products and/or materials. The preferred temperature range is from —5° to +25° C. and even +30° C. and the average duration of the reaction is about 3 to 24 hours. The reaction medium can be strongly acid to weakly alkaline; an acid medium of a pH smaller than 2 is preferred because of its more general applicability to all starting naphthoxidines. In a commercially preferred mode the reaction medium should contain at least about 20% by weight of water. It is also possible, in certain cases, to add the diazonium salt which has been isolated by filtration and optionally drying, to the naphthoxidine starting compound which has been at least partly dissolved in water or in a suitable, inert organic solvent.

The diazonium salt may also be added to the, preferably aqueous, naphthoxidine solution or suspension, in the form of the acid aqueous diazotation solution in which the diazonium salt has been produced in situ.

Quaternized derivatives of the compounds of Formula I in which R is a phenyl radical substituted with one of the heterocyclic radicals defined hereinbefore, and especially with a benzothiazole radical, are obtained by carrying out the above-described substitution of the naphthoxidine ring with the corresponding quaternized and diazotized aminophenyl-substituted heterocyclic starting compound.

Quaternization of the latter starting compounds is carried out in a conventional manner and with the usual quaternizing agents such as dimethyl and diethyl sulfate, methyl or ethyl or propyl bromide or iodide, or methyl or ethyl tosylate.

The process according to the invention is further illustrated by the following diagram:

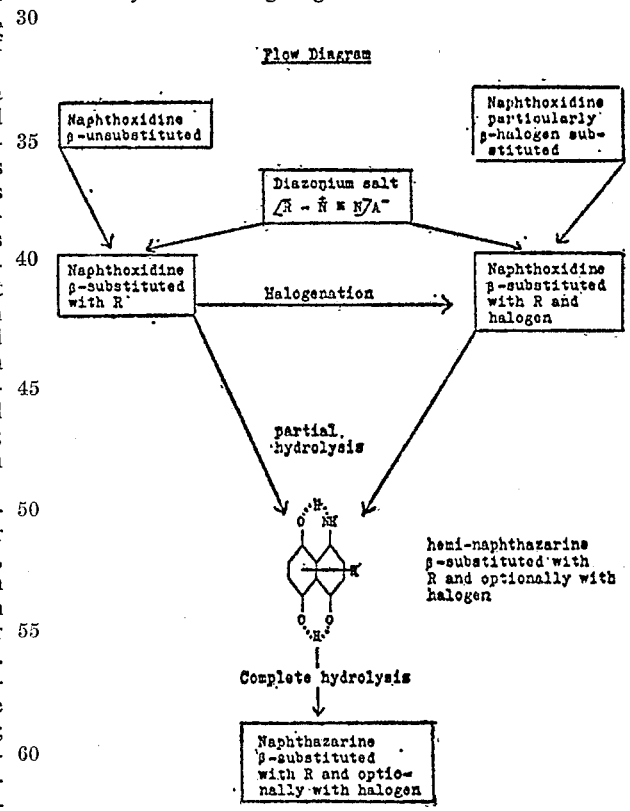

The reaction products are isolated in the usual way and are purified if necessary by recrystallization or chromatographic adsorption. Further substitution, for example by halogenation or hydrolysis, is performed by known methods.

The aryl naphthoxidines according to the invention are black-blue to green-black glittering crystalline substances which, in a finely distributed suitable preparation with dispersing agents, dye cellulose acetate, wool, synthetic polyamides or polyesters, either without or after an optional further treatment, e.g. halogenation, in violet, blue to green shades.

All of the compounds obtained according to the process of the invention are useful as dyestuffs for a wide variety of textile fibers among which there are especially polyester and cellulose di- and triacetate fibers, as well as wool and synthetic polyamide fibers. Dyeings with these compounds are characterized, depending on the nature of the dyed textile material, by good drawing power, and fastness to light, to sublimation, to alkali, to wet treatment, to sea water, and to gas fumes.

Polyester fibers are dyed with aqueous dispersions of dyestuffs according to the invention, advantageously at temperatures of over 100° under pressure. Dyeing can also be performed, however, at the boiling point of the water in the presence of color carriers such as phenylphenol polychlorobenzene compounds or similar auxiliaries.

Cellulose acetate materials which can be dyed with the new naphthoxidine dyestuffs according to the invention are preferably cellulose diacetate and cellulose triacetate fibers and foils; suitable polyester materials for the purposes of the instant invention are, e.g. polymerizates of alkylene-glycol arylene dicarboxylic acid esters, especially diethyleneglycol terephthalate and xylylenediol terephthalate (Terylene; Dacron; Tergal; Trevira; Kodel); suitable polyamide materials are, for instance, hexamethylene adipate polymerizate fibers (nylon), and -caprolactam polymerizate fibers (Perlon).

The new dyestuffs according to the invention are further characterized by an excellent reserve for cotton. They are, therefore, particularly suited for the dyeing of fiber blends of cotton and other textile materials to which the aryl-naphthoxidine dyes have good affinity.

The reaction products can serve further as intermediate products for the production of other valuable dyestuffs.

Thus, the imino groups in 1- and/or 5-position at the naphthalene nucleus of the arylnaphthoxidines according to the invention can be subsequently substituted in the same manner as described by Merian supra, for example, with phenyl, lower alkoxyphenyl, alkoxyalkoxyphenyl, alkoxyalkoxyalkoxy-phenyl, phenylazophenyl.

A chlorination of the β-aryl naphthoxidine according to the invention is carried out preferably with sulfuryl chloride, a bromination with elementary bromine; hydrolysis with a preferably acid hydrolyzing agent such as aqueous sulfuric acid yields as a first stage the corresponding β-arylated hemi-naphthazarines of the formula

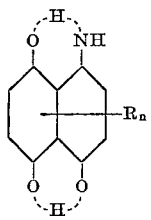

(III)

and complete hydrolysis the corresponding β-arylated naphthazarines of the formula

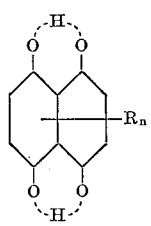

(IV)

wherein R is one of the substituents (I) to (VII) supra and $n$ is at least 1 and preferably not more than 2.

(A) Among the β-arylated naphthoxidines according to the invention, those of the formula

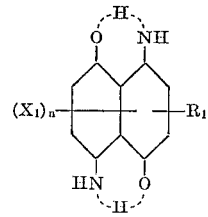

(V)

wherein $n$ is an integer ranging from 0 to 3, $X_1$ is either chlorine, or, preferably, bromine, $R_1$ is phenyl substituted with from 0 to 5 halogen atoms, each halogen atom having an atomic weight of maximally 80, have good drawing power on polyester and cellulose acetate fibers, good fastness to light, of pure blue shades, and good wet fastness, and good resistance to burnt gas fumes.

Those compounds according to the invention, of the above Formula V, in which $R_1$ is phenyl substituted with one to three alkyl groups of maximally 5 carbon atoms, are of similar properties as the preceding group of compounds.

Those compounds of the above Formula V, in which $R_1$ is

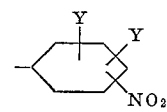

wherein each Y is independently either hydrogen or a halogen atom of an atomic weight of maximally 80, are dyestuffs of very good drawing power on polyester and cellulose acetate, of good sublimation, of pure blue shades, their wet fastness including fastness to alkali, water, perspiration. Of particular importance are the latter fastnesses for dyeings on cellulose di- and triacetate, and the fastness to light, and the fastness to sublimation at temperatures of 160-180° C., for dyeings on polyester fibers, obtained with the last-mentioned group of compounds according to the invention.

Particularly valuable as dyestuffs or as intermediate products for dyestuffs are the reaction products of nitrobenzene-, di- or trichlorobenzene, di- or tribromobenzene and of chloro and dichloro- or bromo- and dibromonitrobenzene diazonium compounds with naphthoxidine.

(B) The dyestuffs according to the invention which have the formula

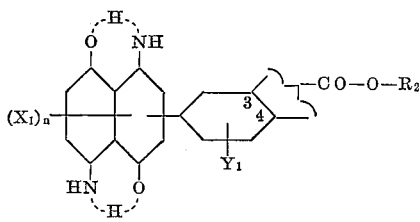

(VI)

wherein $n$ is an integer ranging from 0 to 3, $X_1$ is either chlorine or, preferably, bromine, $R_2$ is either alkyl with maximally 6 carbon atoms, or cyclohexyl, benzyl, methylbenzyl, chlorobenzyl, bromobenzyl or nitrobenzyl, and $Y_1$ is hydrogen or nitro, are dyestuffs of similar properties as the last-mentioned class, but are of even better fastness to sublimation. Optimal results are obtained with the dyestuffs of Formula VI in which Y is nitro in 4-position and the ester radical is in 3-position, $R_2$ being preferably alkyl of from 1 to 6 carbon atoms. Blue to green-blue shades are obtained on cellulose di- and tri-acetate and polyester fibers.

(C) The compounds according to the invention which have the formulas

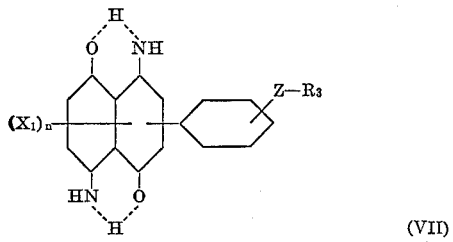

(VII)

and

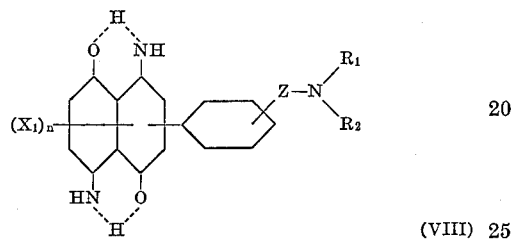

(VIII)

wherein $n$ is an integer ranging from 0 to 3,
$X_1$ represents either chlorine or, preferably, bromine,
$Z$ represents either —CO— or —SO$_2$—,
$R_3$ represents lower alkyl, phenyl, chlorophenyl, or lower alkylphenyl, while, in Formula VIII each of $R_1$ and $R_2$ have independently the meaning given supra under (V), are characterized by more hydrophilic properties than the above-described classes of compounds according to the invention, and are, therefore, better suited for the dyeing of wool and synthetic polyamine fibers, while having similar good fastness property against alkaline milling, chlorine and sea water.

(D) The compounds according to the invention which are of the formula

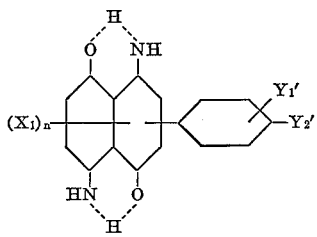

wherein $n$ is an integer ranging from 1 to 2,
$X_1$ represents either a chlorine or, preferably, a bromine atom,
$Y_1'$ represents hydrogen, one fluorine atom or from one to two chlorine, or from one to two bromine atoms, and
$Y_2'$ represents chlorine, bromine or preferably nitro, are dyestuffs which have good drawing power on cellulose acetate and polyester fibers, good fastness to light and sublimation, and fastness to gas fumes, in which latter fastness those excel in which $Y_1'$ represents two chlorine atoms, and $Y_2'$ is also chlorine, i.e. those having three chlorine atoms as substituents of the benzene nucleus.

This group of dyestuffs is further distinguished by their stability in dyeing processes requiring dyeing baths at temperature above 100° C.

The following examples further illustrate the invention. Parts are given therein as parts by weight and the temperatures are in degree Centigrade.

EXAMPLE 1

21.8 parts of 1,5-dinitronaphthalene are reduced in the known manner with sulfur sesquioxide in sulfuric acid to naphthoxidine. The sulfur which precipitates is removed from the solution of the reduction product in sulfuric acid by filtration. The filtrate is then slowly poured into water and ice while stirring well.

The aqueous hydrochloric acid solution of the diazonium compound resulting from diazotization of 17.8 parts of 2,4-dichloroaniline is added dropwise within about 30 minutes to the blue-violet solution or suspension of naphthoxidine obtained as described above. Foaming ensues and nitrogen is split off. The reaction is completed in about 16 hours at 25°. The precipitated crude product is filtered off under suction, washed with water and, to purify the same, it is stirred into about 1000 parts of water and sodium hydroxide solution is added until the pH is about 12 to 13. The suspension is stirred for 2 hours at room temperature and then the precipitate is filtered off. After washing the blue-black residue with water, it is dissolved in 500 parts of boiling ethanol and any undissolved impurities are filtered off from the solution. The alcoholic solution is evaporated to dryness. A glittering, blue-black crystal powder is obtained which melts at 208–210° with decomposition. In ethanol it dissolves with an intensive pure reddish-blue color. Its composition corresponds to the formula

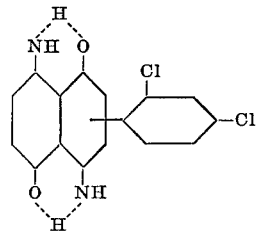

In acqueous dispersion, the substance dyes cellulose di- and tri-acetate and also polyester fibers in reddish-blue shades which have very good wet and light fastness properties.

If in the above example, the diazonium compounds from the amine given in the following Table I are used, which amines are used in amounts which are equimolar to the amine used in the example and otherwise the same procedure is followed, then correspondingly substituted derivatives are obtained which have similar properties.

TABLE I

| No. | Amine | Shade of dyeing with corresponding aryl compound on cellulose diacetate |
|---|---|---|
| (1) | Aminobenzene | Reddish-blue. |
| (2) | 1-amino-4-methylbenzene | Do. |
| (3) | 1-amino-2,5-dimethylbenzene | Do. |
| (4) | 1-amino-4-chlorobenzene | Do. |
| (5) | 1-amino-2-methyl-4-chlorobenzene | Do. |
| (6) | 1-amino-2-methoxy-4-chlorobenzene | Do. |
| (7) | 1-amino-3,4-dichlorobenzene | Greenish-blue. |
| (8) | 1-amino-2,5-dichlorobenzene | Do. |
| (9) | 4-aminobenzene sulfamide | Do. |
| (10) | 3-amino-1-N,N-diethyl-sulfamyl benzene | Do. |
| (11) | 4-aminobenzene methylsulfone | Do. |
| (12) | 4-amino-1-methylsulfonyl-benzene | Reddish-blue. |
| (13) | 1-amino-4-nitrobenzene | Greenish-blue. |
| (14) | 1-amino-3-nitrobenzene | Reddish-blue. |
| (15) | 1-amino-2-nitrobenzene | Do. |
| (16) | 1-amino-2,5-dimethyl-4-nitrobenzene | Blue. |
| (17) | 1-amino-2-methoxy-4-nitrobenzene | Blue-violet. |
| (18) | 1-amino-2-chloro-4-nitrobenzene | Greenish-blue. |
| (19) | 1-amino-2-bromo-4-nitrobenzene | Do. |
| (20) | 1-amino-4-chloro-2-nitrobenzene | Do. |
| (21) | 2-amino-4-chlorodiphenyl ether | Blue-violet. |
| (22) | 1-amino-2,4-dibromobenzene | Reddish-blue. |
| (23) | 1-amino-2,4-difluorobenzene | Do. |
| (24) | 3-aminopyridine | Greenish-blue. |
| (25) | 6-aminoquinoline | Do. |
| (26) | 6-aminoindazole | Do. |
| (27) | 2-(4'-aminophenyl)-6-methyl-benzthiazole | Do. |
| (28) | 1-aminonaphthalene | Do. |
| (29) | 1-amino-4-cyanobenzene | Do. |
| (30) | 1-amino-4-hydroxyethyl-benzene | Reddish-blue. |
| (31) | 1-amino-4-ethoxy-ethyl-benzene | Do. |
| (32) | 4-amino-diphenylketone | Do. |
| (33) | 4-amino-diphenylether | Do. |
| (34) | 4-amino-diphenyl-thioether | Do. |
| (35) | 4-amino-benzoic acid amide | Greenish-blue. |
| (36) | 1-amino-4-methyl-carbonyl-benzene | Do. |
| (37) | Mesidine | Reddish blue. |
| (38) | 1-amino-4-isopropyl benzene | Do. |

EXAMPLE 2

21.8 parts of 1,5-dinitronaphthalene are reduced in sulfuric acid with sulfur sesquioxide to naphthoxidine and the solution is diluted with ice water as described in Example 1.

A solution of the diazonium sulfate from 21.6 parts of 2,4,5-trichloro-1-aminobenzene is added dropwise, within about 1 hour while stirring, to the ice cold sulfuric acid aqueous solution of the naphthoxidine. After stirring for 18 hours at 10 to 15° the crude product, which has formed with development of nitrogen, is filtered off and purified as described in Example 1. A blue-black glittering product which dissolved in ethanol with a pure greenish-blue color is obtained. It is obtained in pure form by chromatographic adsorption when it then melts at 196–198° on decomposition.

Elementary analysis corresponds to the formula

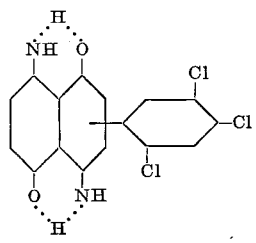

Found (percent): C, 52.25; H, 2.46; Cl, 28.96; N, 7.63.
Calculated (percent): C, 52.21; H, 2.36; Cl, 28.94; N, 7.44.

Dispersed in water in the usual way, the dyestuff produces pure greenish-blue dyeings on acetate silk or polyester fibers. The dyeings are fast to wet and light. The drawing power of the dyestuff is remarkably good.

If in the above example, instead of the diazonium compound from 21.6 parts of 2,4,5-trichloro-1-aminobenzene, diazonium compounds from corresponding amounts of the amines given in the following Table II are used and otherwise the same procedure is followed, then blue dyestuffs having similar properties are obtained.

TABLE II

| No. | Amine | Shade of dyeing with corresponding aryl compound on cellulose diacetate |
|---|---|---|
| (1) | 1-amino-2,3,4-trichlorobenzene | Greenish-blue. |
| (2) | 1-amino-3,4,5-trichlorobenzene | Do. |
| (3) | 1-amino-2,3,4,6-tetrachlorobenzene | Do. |
| (4) | Amino-pentachlorobenzene | Do. |
| (5) | 1-amino-4-chloro-3-trifluoromethylbenzene | Do. |
| (6) | 1-amino-2,5-dichloro-4-nitrobezene | Do. |
| (7) | 1-amino-2,6-dichloro-4-nitrobenzene | Do. |
| (8) | 1-amino-2,6-dibromo-4-nitrobenzene | Do. |
| (9) | 2-amino-4,4'-dichloro-diphenyl ether | Reddish-blue. |
| (10) | 3-amino-1-(3'-chloro-phenylsulfonyl)-benzene | Greenish-blue. |
| (11) | 1-amino-5,8-dichloronaphthalene | Blue-green. |
| (12) | 1-amino-4-nitronaphthalene | Do. |
| (13) | 1-amino-2,4,5-tribromobenzene | Greenish-blue. |
| (14) | 1-amino-4-(p-tolyl)sulfonyl-benzene | Do. |

EXAMPLE 3

21.8 parts of 1,5-dinitronaphthalene are reduced to naphthoxidine in the usual way with sulfur sesquioxide in 185 parts of sulfuric acid. Excess sulfur is removed by filtration of the sulfuric acid solution of the reaction product and the filtrate is diluted with 300 parts of ice while cooling. A diazonium sulfate solution, obtained by diazotisation of 20 parts of 2-nitro-5-aminobenzoic acid-n-butyl ester, dissolved in 90 parts of concentrated sulfuric acid while cooling, is added dropwise to this dilute solution of the naphthoxidine at a temperature of 15 to 20° within about 4 hours. After stirring for another 3 hours, during which time the nitrogen development decreases, the reaction mass is diluted with 1500 parts of ice and water. The precipitated crude product is filtered off, washed with water, dilute sodium carbonate solution and again with water and dried. A difficultly soluble, black impurity is removed by extraction with 500 parts of boiling ethanol. A blue-black glittering dyestuff is obtained which dissolves in ethanol with an intensively pure blue color. It is obtained in pure form by recrystallization or chromatographic adsorption on aluminum oxide, and it corresponds to the formula

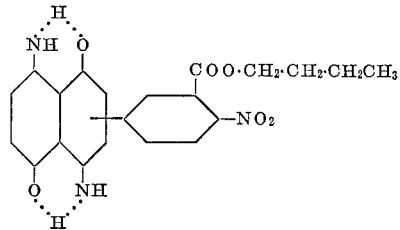

TABLE III

| No. | Amine | Shade of dyeing of corresponding aryl compound on polyester fibers |
|---|---|---|
| (1) | 2-nitro-5-amino-benzoic acid methyl ester | Greenish-blue. |
| (2) | 2-nitro-5-amino-benzoic acid ethyl ester | Do. |
| (3) | 2-nitro-5-amino-benzoic acid isopropyl ester | Do. |
| (4) | 2-nitro-5-amino-benzoic acid n-amyl ester | Do. |
| (5) | 2-nitro-5-amino-benzoic acid cyclohexyl ester | Do. |
| (6) | 2-nitro-5-amino-benzoic acid β-ethoxyethyl ester | Do. |
| (7) | 1-amino-2-chloro-4-nitro-benzene | Do. |
| (8) | 1-amino-2-bromo-4-nitro-benzene | Do. |
| (9) | 1-amino-4-bromo-3-nitro-benzene | Do. |
| (10) | 1-amino-2,5-dichloro-4-nitro-benzene | Do. |
| (11) | 4-amino-3-nitrobenzene sulfonic acid diethylamide | Do. |
| (12) | 1-amino-2,4,5-trichlorobenzene | Blue. |
| (13) | 1-amino-2,3,4-trichlorobenzene | Do. |
| (14) | 1-amino-4-chloro-3-trifluoromethyl-benzene | Greenish-blue. |
| (15) | 2-nitro-5-amino-benzoic acid-benzyl ester | Do. |
| (16) | 2-nitro-5-amino-benzoic acid-2-methylbenzyl ester | Do. |
| (17) | 2-nitro-5-amino-benzoic acid-4-chlorobenzyl ester | Do. |
| (18) | 2-nitro-5-amino-benzoic acid-4-bromobenzyl ester | Do. |
| (19) | 2-nitro-5-amino-benzoic acid-4-nitrobenzyl ester | Do. |
| (20) | 4-amino-benzene-1-sulfonic acid monomethylamide | Do. |
| (21) | 1-aminobenzene-3-sulfonic acid-2-methylphenyl ester | Green-blue |
| (22) | 4-amino-azobenzene | Do. |
| (23) | 4-aminobenzene-sulfonic acid-monoethylamide | Do. |
| (24) | 4-aminobenzoic acid hexyl ester | Greenish blue. |
| (25) | 4-aminobenzoic acid methyl ester | Do. |
| (26) | 4-amino-benzoic acid β-ethoxyethyl ester | Do. |
| (27) | 3-amino-benzoic acid β-ethoxyethyl ester | Do. |

It dyes cellulose acetate and polyester fibers from a suitable aqueous dispersion in pure blue shades which have good fastness properties, in particular very good fastness to sublimation on polyester material.

If in the process described in the above example, a mixture of 200 parts of glacial acetic acid and 70 parts of concentrated hydrochloric acid is used for the diazotisation instead of the 90 parts of sulphuric acid, then a somewhat higher yield of the same dyestuff is obtained.

If in the above example, with otherwise the same procedure, the diazonium compounds from equimolecular amounts of the amines given in the above Table III are used, then correspondingly substituted derivatives having similar properties are obtained.

EXAMPLE 4

10.4 parts of dibromo naphthoxidine, obtained as described in German Pat. No. 841,314, are dissolved in 200 parts of dimethyl formamide. The diazonium chloride solution from 4.94 parts of 4-nitroaniline is added dropwise to the solution within 1 hour at a temperature between 0 and 10°. Nitrogen is developed. After stirring for 6 hours at 5 to 10°, the solution is diluted with water, the product which precipitates is filtered off and washed. It is purified by recrystallization from ethanol. In polar organic solvents the reaction product dissolves with a green-blue color; the color is considerably more green than that of the starting material. As dispersion dyestuff, the new compound dyes synthetic fibers such as cellulose acetate or polyester fibers in very pure green-blue shades of good color strength.

Similar dyestuffs are obtained if, in the above example, the reaction components are replaced by equivalent amounts of the starting materials given in the following Table IV.

Similar products are obtained if in the process described in the above example, equivalent amounts of diazo compound of 3,4-dichloro-1-aminobenzene or 2-chloro-4-nitro-1-aminobenzene are used instead of that of 4-nitro-1-aminobenzene.

EXAMPLE 6

A solution of naphthoxidine in sulfuric acid is produced from 10.9 parts of 1,5-dinitro-naphthalene in the known way with sulfur sesquioxide. 10.0 parts of 2-aminothiazole, dissolved in 100 parts by volume of 60% sulfuric acid are then diazotised with nitrosyl sulfuric acid at −5 to 0°, and the two solutions are mixed while cooling well. This mixture is added dropwise within about three hours while stirring well into ice water, allowed to react for 2 hours and the product which precipitates is filtered off. Undissolved impurities are removed by recrystallization from ethylene glycol monoethyl ether and, in a dry state, it is a green-black glittering crystalline powder which dissolves in ethylene glycol monoethyl ether with a pure green color.

It corresponds to the formula

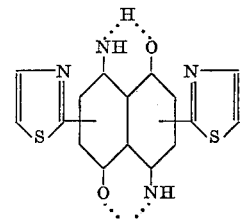

Green, disubstituted derivatives having similar properties are obtained if the procedure given in the above example is followed by equivalent amounts of the di-

TABLE IV

| No. | Naphthoxidine component | Amine for diazonium component | Arylated product shade of dyeing on polyester |
|---|---|---|---|
| (1) | 3,7-dibromo-naphthoxidine | 1-amine-2,4-dichlorobenzene | Greenish-blue. |
| (2) | do | 1-amino-2,4-dibromobenzene | Do. |
| (3) | do | 1-amino-2,4,5-trichloro-benzene | Do. |
| (4) | do | 1-amino-2-chloro-4-nitro-benzene | Green-blue. |
| (5) | do | 1-amino-2,5-dichloro-4-nitrobenzene | Do. |
| (6) | 3-bromo-naphthoxidine | 1-amino-2-chloro-4-nitrobenzene | Greenish-blue. |
| (7) | 2-chloro-naphthoxidine | 1-amino-4-nitrobenzene | Do. |
| (8) | 2,6-dichloro-naphthoxidine | 1-amino-2,4,5-trichloro-benzene | Green-blue. |
| (9) | 3,7-dibromo-naphthoxidine | 1-amino-2-bromo-4-nitrobenzene | Do. |
| (10) | do | 3-amino-6-nitrobenzoic acid-n-butylester | Do. |
| (11) | 3-bromo-7-phenylamino-naphthoxidine | 1-amino-2-chloro-4-nitrobenzene | Greenish-blue. |
| (12) | 2-methyl-naphthoxidine | 1-amino-2-fluoro-4-nitrobenzene | Green-blue. |
| (13) | 3-bromo-7-phenylamino-naphthoxidine | 1-amino-2,4,5-trichloro-benzene | Greenish-blue. |
| (14) | 2-methyl-naphtohxidine | 1-amino-2,4,5-trichlorobenzene | Do. |
| (15) | 2-methyl-naphthoxidine | 2-nitro-5-aminobenzoic acid methyl ester | Greenish-blue. |
| (16) | 3,7-dichloro-naphthoxidine | 2-nitro-5-aminobenzoic acid butyl ester | Do. |
| (17) | 3-bromo-7-phenylamino-naphthoxidine | 2-nitro-5-aminobenzoic acid ethyl ester | Do. |
| (18) | 2-methyl-naphthoxidine | 1-amino-4-phenylsulfonyl-benzene | Do. |
| (19) | 3-bromo-7-phenylamino-naphthoxidine | 1-amino-4-methylsulfonyl-benzene | Do. |
| (20) | 3,7-dichloro-naphthoxidine | 1-amino-4-methylsulfonyl-benzene | Do. |

EXAMPLE 5

9.4 parts of naphthoxidine in the form of its zinc chloride double salt are dissolved in 280 parts of dimethyl formamide. An aqueous diazonium chloride solution of 13.8 parts of 4-nitroaniline is added to this solution within one hour at 5 to 10°. On completion of the nitrogen development, the product is worked up as described in Example 3. A glittering green-black product which dissolves in ethanol with a pure green and in concentrated sulfuric acid with a brown-orange color is obtained. It corresponds to the formula:

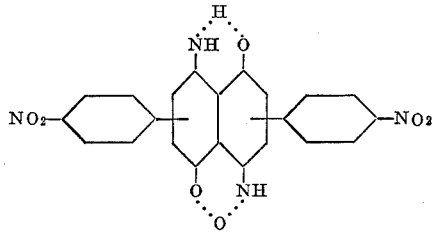

azonium compounds from the heterocyclic amines given in the following Table V are used.

TABLE V

| No. | Heterocyclic amine | Color of corresponding aryl compound in a glycol monoethyl ether solution |
|---|---|---|
| (1) | 2-aminobenzthiazole | Green. |
| (2) | 2-amino-6-methoxy-benzthiazole | Do. |
| (3) | 3-aminoindazole | Do. |
| (4) | 2-amino-5-methyl-thiodiazole-(1,3,4) | Do. |
| (5) | 2-amino-5-nitrothiazole | Dark green. |

EXAMPLE 7

9.3 parts of monocondensation production from naphthoxidine and 1-amino-4-ethoxybenzene according to U.S. Pat. 2,066,119 are dissolved in dimethyl formamide, 4.94 parts of diazotised 1-amino-4-nitrobenzene are added and the product is isolated as described in Example 4. A green dyestuff is obtained which, in chromatogram, has a different Rf value from the starting material.

Similar dyestuffs are obtained by the same method if, instead of 1-diazo-4-nitrobenzene, corresponding amounts of 1-diazo-2-chloro-4-nitrobenzene or 1-diazo-2,4-dichlorobenzene are used.

EXAMPLE 8

26.8 parts of the end product obtained according to Example 1 are dissolved in 300 parts of chloroform and 15.2 parts of bromine are added. The reaction mixture is refluxed for 2 hours. The solution obtained is washed neutral with water and the chloroform is distilled off.

The brominated dyestuff, which is obtained in a pure form in the usual way, e.g. by recrystallizing or absorption on an aluminum oxide column, corresponds to the formula

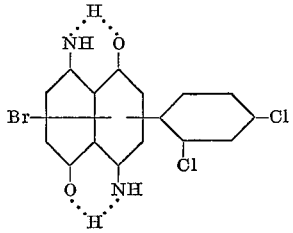

From a suitable aqueous dispersion, it dyes cellulose acetate and polyester fibers in pure blue shades which have very good fastness properties. It has good drawing power.

If in the above example, instead of the 26.8 parts of end product according to Example 1, equivalent amounts of the arylated naphthoxidine in the following Table VI are used, then dyestuffs having similar properties are obtained.

TABLE VI

No.   Starting material to be brominated

| | Brominated product shade of dyeing on cellulose diacetate |
|---|---|
| (1) R=4-chlorophenyl | Reddish blue. |
| (2) R=2,5-dichlorophenyl | Do. |
| (3) R=3,4-dichlorophenyl | Greenish blue. |
| (4) R=2,4,5-trichlorophenyl | Do. |
| (5) R=3,4,5-trichlorophenyl | Do. |
| (6) R=2,4-dibromophenyl | Reddish blue. |
| (7) R=2,5-dibromophenyl | Do. |
| (8) R=4-nitrophenyl | Greenish blue. |
| (9) R=2-chloro-4-nitrophenyl | Do. |
| (10) R=4-chloro-2-nitrophenyl | Do. |
| (11) R=2,5-dichloro-4-nitrophenyl | Do. |
| (12) R=2,6-dibromo-4-nitrophenyl | Do. |
| (13) R=4-ethoxycarbonylphenyl | Reddish blue. |
| (14) R=4-nitro-1-naphthyl | Blue-green. |
| (15) R=2-bromo-4-nitro-phenyl | Do. |
| (16) R=2,4-difluorophenyl | Greenish blue. |
| (17) R=2-methyl-4-nitro-phenyl | Do. |
| (18) R=2,5-dimethyl-4-nitrophenyl | Do. |
| (19) R=4-methyl carbonyl phenyl | Do. |
| (20) R=4-methylsulfonylphenyl | Do. |
| (21) R=3-(N,N-diethyl-sulfamyl)-phenyl | Do. |
| (22) R=4-carbamyl-phenyl | Do. |

EXAMPLE 8a

If the procedure given in the above example is followed but instead of 15.2 parts, 30.4 parts of bromine are used, then dyestuffs having similar properties and a somewhat more green shade are obtained. Their composition corresponds to the formula:

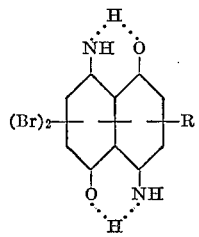

Chlorine-containing blue dyestuffs are obtained by the above method if the bromine is replaced by the equivalent amount of sulfuryl chloride.

The naphthoxidine dyestuff of the formula

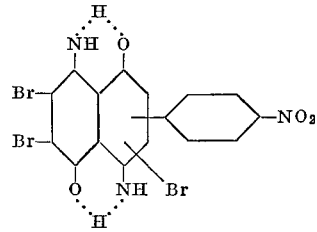

is obtained by repeating the procedure of Example 8 with 25.3 parts of the starting material No. 8 of Table VI and 43 parts of bromine. It dyes polyester fibers in a greenish blue shade. Thin layer chromatography yields each of the two isomers of the above formula which are contained in a ratio of about 1:1 in the dyestuff obtained as described above. For all practical purposes, use of the unchromatographed dyestuffs is preferred. This is also the case with all dyestuffs produced by the other examples given herein unless expressly stated otherwise.

EXAMPLE 9

10 parts of the substance obtained according to Table III, No. 7 of the formula

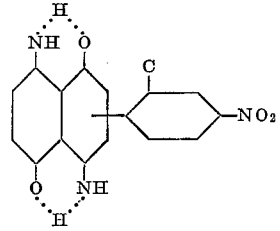

are dissolved in 180 parts of 75% aqueous sulfuric acid. The solution is kept for 16 hours at a temperature of 30–40° and then diluted with water and ice. The precipitated product is filtered off, washed neutral and dried. It is obtained in a pure form by recrystallization from chlorobenzene or by chromatographic adsorption on aluminum oxide, and corresponds to the formula

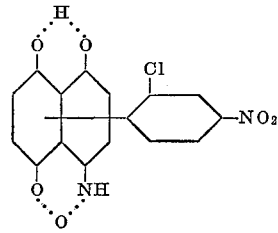

The dyestuff dissolves in polar organic solvents with a violet color and it dyes cellulose acetate and polyester fibers from an aqueous dispersion in reddish blue shades.

If the solution in 75% sulfuric acid obtained by the above method is diluted with 500 parts of water and the suspension is heated for 4 hours at 80–90°, then after isolating as described above, a product is obtained which dissolves in pure form by recrystallisation from ethanol and it corresponds to the formula

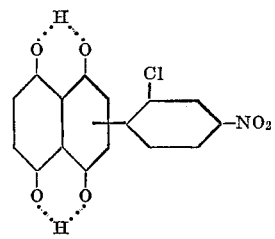

From an aqueous dispersion, the dyestuff dyes cellulose acetate and polyester fibers in red shades.

Dyestuffs having similar shades are obtained, if by the procedure described in the above example, 10 parts of the substance obtained according to Table III No. 12 are used as starting material.

EXAMPLE 10

21.8 parts of 1,5-dinitronaphthalene are converted according to Example 3 into naphthoxidine, and the filtered sulfuric acid solution thereof is diluted with 1000 parts of ice. Within 3 hours at 20°, a diazonium sulfate solution—obtained by diazotizing 18 parts of 4-amino-3,2'-dimethylazobenzene in 150 parts of concentrated sulfuric acid—is added dropwise to this naphthoxidine solution, 170 parts of water being dropped in at the same time. After another 2 hours stirring at 20°, the reaction solution is diluted with 1500 parts of ice and water, the precipitated crude product is separated by filtration, freed from acid by washing with water, and dried. The product is freed from a low-soluble black contamination by extraction with 500 parts of boiling ethyl acetate. A dyestuff is obtained which dissolves in ethanol with a deep pure green, in 50% sulfuric acid with a deep violet color. It is obtained in its pure form by recrystallization from chlorobenzene and corresponds to the formula

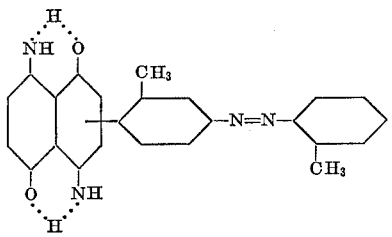

Used in a suitable aqueous dispersion, it dyes polyester fibers and cellulose acetate in pure green shades of good fastness properties.

When, in the above example, the diazonium compounds are replaced by equimolecular amounts of the aminobenzenes listed in the following Table VII, the procedure being otherwise the same as before, correspondingly substituted derivatives of similar properties are obtained.

TABLE VII

| No. | Amino-azobenzene | Shade of dyeing effected with the corresponding aryl compound on polyester fibers |
|---|---|---|
| (1) | 4-amino-azobenzene | Blue-green. |
| (2) | 4-amino-3-methyl azobenzene | Green. |
| (3) | 4-amino-2-methyl azobenzene | Do. |
| (4) | 4-amino-4'-chloro-azobenzene | Bluish-green. |
| (5) | 4-amino-3',4'-dichloro-azobenzene | Blue-green. |
| (6) | 4-amino-4'-hydroxy-azobenzene | Green. |
| (7) | 4-amino-4'-dimethylamino-azobenzene | Blue-green. |
| (8) | 4-amino-2'-chloro-4'-nitro-azobenzene | Bluish-green. |
| (9) | 4-amino-2-methyl-4'-nitro-azobenzene | Do. |
| (10) | 2'(4-aminophenyl)-6-methyl-benzothiazole | Greenish-blue. |
| (11) | 4-amino-3-ethyl-4'-bromo-azobenzene | Green. |
| (12) | 4-amino-4'-ethylamino-azobenzene | Blue-green. |
| (13) | 4-amino-2',4'-dimethyl-azobenzene | Green. |
| (14) | 4-amino-2',4'-dibromo-azobenzene | Blue-green. |

EXAMPLE 11

2 parts of the dyestuff No. 19 in Table I in Example 1 are dispersed in 4000 parts of water. 12 parts of the sodium salt of o-phenylphenol and 12 parts of diammonium phosphate are added to this dispersion. 100 parts of terephthalic acid polyglycol ester yarn are dyed for 1½ hours at 95–98°. The dyeing is rinsed and after-treated with dilute sodium hydroxide solution and a dispersing agent. In this way a greenish blue dyeing is obtained which is fast to washing, sublimation and light.

If in the above example, the 100 parts of polyester yarn are replaced by 100 parts of cellulose triacetate fabric, dyeing is performed under the conditions given and the dyeing is then rinsed with water, then a blue dyeing is obtained which is distinguished by a high degree of wet and light fastness.

EXAMPLE 12

2 parts of the dyestuff obtained according to Example 3 are finely suspended in 2000 parts of water containing 4 parts of a synthetic dispersing agent in a pressure dyeing apparatus. The pH of the dye bath is adjusted to 6.0 to 6.5 with acetic acid. 100 parts of terephthalic acid polyester fabric are introduced at 50°, the bath is heated within 30 minutes to 120° and dyeing is performed for 50 minutes at this temperature. The dyeing is rinsed, soaped and dried. A blue dyeing of pure shade is obtained which is fast to washing, light and very good sublimation.

EXAMPLE 13

2 parts of the dyestuff No. 4 in Table VI of Example 8 are finely suspended in 3000 parts of water containing 6 parts of synthetic dispersing agent. 100 parts of cellulose acetate fabric are introduced at 30–40°, the temperature is raised within 30 minutes to 80° and dyeing is performed at this temperature for 50 minutes. The blue dyeing obtained is rinsed and dried. It has very good fastness to water, washing and light as well as remarkable fastness to industrial fumes, especially burnt gas fumes.

EXAMPLE 14

A storable dyestuff-dispersant mixture is prepared by intimately mixing by grinding together and subsequently atomizing a mixture of (a) 1 part of the dyestuff No. 7 of Table III prepared according to Example 3, 1 to 3 parts of a synthetic dispersing agent, naphthalene sulfonic acid-formaldehyde condensation product containing the aforesaid components in a ratio of 12:1 by weight, (b) 1 part of the dyestuff No. 15 of Table VI, prepared according to Example 8a, 1 to 3 parts of lignin sulfonate, sold as Attisol 2, (c) a mixture of 1 part of the dyestuff No. 9 of Table VI prepared according to Example 8a, 1 part of a synthetic dispersing agent, naphthalene sulfonic acid-formaldehyde condensation product containing the aforesaid components in a ratio of 12:1 by weight, 1 part of lignin sulfonate, sold as Attisol 2.

From the above storable compositions, dyebaths for disperse dyeing of polyester fibers can be prepared by adding water and, if desired, a wetting agent.

EXAMPLE 15

A storable dyestuff-dispersant mixture is prepared by intimately mixing by grinding together and subsequently atomizing a mixture of 1 part of the dyestuff of Example 3,
1 to 3 parts of lignin sulfonate, sold as Attisol 2,
0.01 to 0.5 part of dodecyl benzene sulfonate as wetting agent.

Such storable mixtures as described in Examples 14 and 15 may also be in the form of pastes containing about 1 to 3 parts of water obtained by wet grinding the aforesaid ingredients.

In a similar manner, storable dyestuff dispersant mixtures of equally good properties can be produced with the other dyestuffs described in Examples 1–9.

In a second aspect, the invention concerns new use of new naphthoxidines which are arylated at the central naphthalene ring, new compositions containing as a coloring ingredient naphthoxidines of the last-mentioned type for the dyeing of textile, and particularly of hydrophobic polyester fibers and foils. It also concerns the hydrophobic textile materials dyed with the new arylated naphthoxidines.

In the following portion of this specification, which relates to said second aspect, reference in any example to a preceding example means the designated preceding example of this second aspect-portion of the specification.

It is one of the problems in the dyeing of fibers and foils of polyesters, which comprise as used in this specification and in the appended claims, cellulose di- and tri-acetate as well as polyesters in the narrower sense, namely, glycol esters or arylene dicarboxylic acids, especially of the poly-hydroxyethyl terephthalate type, to find dyestuffs which dye these materials with satisfactory drawing power in shades which are fast to light and of at least satisfactory fastness to sublimation; preferably such dyeings on polyester fibers and foils should also be fast to alkali, to wet treatment, to sea water and gas fumes.

The method of dyeing the said polyester materials according to the invention, comprises dyeing of said materials preferably from an aqueous dispersion, with dyestuffs which fall under one of the formulas

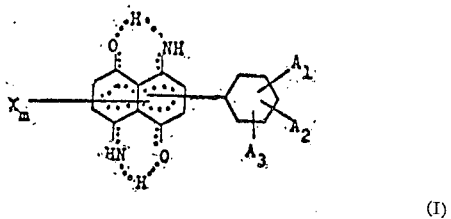

(I)

wherein:

$A_1$ represents nitro, fluorinated lower alkyl, alkoxy-carbonyl of a total of from 2 to 8 carbon atoms, alkoxy-alkoxycarbonyl of a total of from 3 to 8 carbon atoms, cyclohexyloxy - carbonyl, benzyloxy-carbonyl, lower alkyl-benzyloxy-carbonyl, chlorobenzyloxy - carbonyl, bromo-benzyloxy-carbonyl, nitro-benzyloxy - carbonyl, lower alkyl-sulfonyl, N,N-di-(lower alkyl)-sulfamyl, phenylcarbonyl, N,N-di-(lower alkyl)-carbamyl N-phenyl-N-lower alkyl-carbamyl or lower alkanoyl;

$A_2$ represents hydrogen, chloro, bromo, fluoro, alkyl of 1 to 5 carbon atoms, or trifluoromethyl;

$A_3$ represents hydrogen, chloro, bromo, fluoro and alkyl of 1 to 5 carbon atoms;

X represents a member of hydrogen, halogen with an atomic weight of maximally eighty, $m$ is an integer ranging from 0 to 3 whereby dyeings are obtained which are distinguished by excellent light fastness as well as satisfactory fastness to sublimation.

It is particularly unexpected that those substituents at the phenyl substituent which lead to satisfactory dyeings with naphthoxidines which bear phenyl substituents at one or both imino groups of the naphthoxidine nucleus, for example, the alkoxy substituent in the known compound of the formula

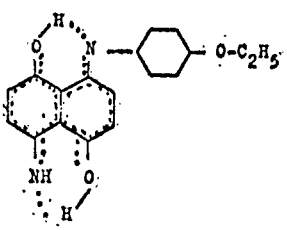

(IA)

or also, alkoxy-alkoxy, alkoxy-alkoxy-alkoxy or phenylazo and the like substituents, which are preferred in order to obtain polyester dyeings fast to light and sublimation, fail in this respect when present on a benzene nucleus directly substituted in β-position on the naphthalene nucleus of the naphthoxidine molecule. Naphthoxidines ring-substituted by phenyl fail in drawing power, fastness to light and/or fastness to sublimation when they are unsubstituted or bear one of the last-mentioned substituents of the known N-phenyl naphthoxidines.

Similarly good dyeings on polyesters as are obtained with dyestuffs of Formula I are also obtained with dyestuffs of the following formula

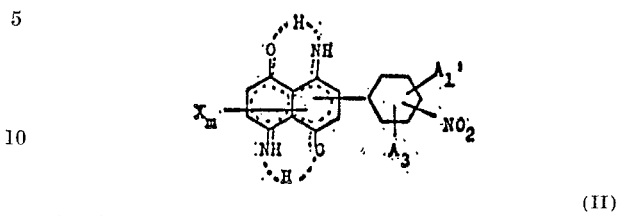

(II)

wherein:

$A_1'$ represents fluorinated lower alkyl, alkoxycarbonyl of a total of from 1 to 8 carbon atoms, alkoxy-alkoxycarbonyl of a total of from 1 to 8 carbon atoms, cyclohexyloxy-carbonyl, benzyloxy-carbonyl, methyl - lower-alkyl-benzyloxycarbonyl, chlorobenzyloxy - carbonyl, bromobenzyloxycarbonyl, nitrobenzyloxy - carbonyl, lower alkylsulfonyl, N,N-di(lower alkyl)-sulfamyl, phenylcarbonyl, N,N-di-(lower alkyl)-carbamyl, N-phenyl-N-lower alkylcarbamyl or lower alkanoyl, and $m$, $A_3$ and X have the meanings given hereinbefore.

Dyeings with these compounds are characterized, depending on the nature of the dyed textile material, by good drawing power, and fastness to light, to sublimation, to alkali, to wet treatment, to sea water, and to gas fumes.

Polyester fibers are dyed with aqueous dispersions of dyestuffs according to the invention, advantageously at temperatures of over 100° under pressure. Dyeing can also be performed, however, at the boiling point of the water in the presence of color carriers such as phenylphenol, polychlorobenzene compounds or similar auxiliaries.

Cellulose acetate materials which can be dyed by the method according to the invention with the new naphthoxidine dyestuffs by the method of Formulas I and II, and those of Formulas III and V described hereinafter, cellulose diacetate and cellulose triacetate fibers and foils; suitable polyester materials for the purposes of the instant invention are, e.g., polymerizates of alkyleneglycol arylene dicarboxylic acids esters, especially diethylene-glycol terephthalate and hexahydro xylylenediol terephthalate (Terylene; Dacron; Tergal; Trevira; Kodel); suitable polyamide materials are, for instance, hexamethylene adipate polymerizate fibers (nylon), and -caprolactam polymerizate fibers (Perlon).

The new dyestuffs used in the new method according to the invention are further characterized by an excellent reserve for cotton. They are, therefore, particularly suited for the dyeing of fiber blends of cotton and other textile materials to which the aryl-naphthoxidine dyes of Formulas I to V have good affinity.

Those compounds of the above Formula I, in which $R_1$ is

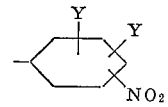

wherein each Y is independently either hydrogen or a halogen atom of an atomic weight of maximally 80, are dyestuffs of very good drawing power on polyester and cellulose acetate, of good sublimation, of pure blue shades, their wet fastness including fastness to alkali, water, perspiration. Of particular importance are the latter fastness for dyeings on cellulose di- and triacetate, and the fastness to light, and the fastness to sublimation at temperatures of 160–180° C., for dyeings on polyester fibers, obtained with the last-mentioned group of compounds according to the invention.

The compounds which fall under Formula I and are of the formula

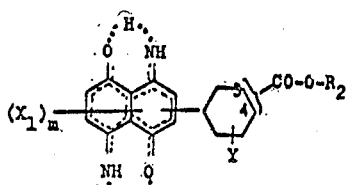

(III)

wherein:

m is an integer ranging from 0 to 3,
X is either hydrogen, chlorine or, preferably, bromine,
$R_2$ is either alkyl with maximally 7 carbon atoms, or cyclohexyl, benzyl, methylbenzyl, chlorobenzyl, bromobenzyl or nitrobenzyl, and
Y is hydrogen or nitro, are dyestuffs of similar properties as the last-mentioned class, but afford polyester dyeings of even better fastness to sublimation. Optimal results are obtained with the dyestuffs of Formula III in which Y is nitro in 4-position and the ester radical is in 3-position. Blue to green-blue shades are obtained by using these dyestuffs on cellulose acetate and polyester fibers.

The compounds of the formula

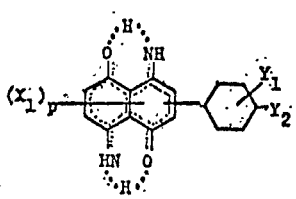

(IV)

wherein:

p is an integer ranging from 1 to 2,
$X_1$ represents either a chlorine or, preferably a bromine atom,
$Y_1$ represents from one to two chlorine, bromine or hydrogen atoms, and
$Y_2$ represents chlorine, bromine or preferably nitro, are dyestuffs which have good drawing power on polyglycolterephthalate and other polyester fibers, good fastness to light and sublimation, and fastness to gas fumes, in which latter fastness those excel in which $Y_1$ represents two chlorine atoms, and $Y_2$ is also chlorine, i.e. those having three chlorine atoms as substituents of the benzene nucleus.

This group of dyestuffs is further distinguished by their stability in dyeing processes requiring dyeing baths at temperatures above 100° C.

Among the β-arylated naphthoxidines of Formula IV, those of the formula

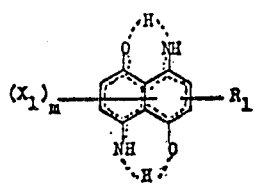

(V)

wherein m is an integer ranging from 0 to 3,
$X_1$ is either chlorine, or, preferably, bromine,
$R_1$ is phenyl substituted with from 2 to 5 halogen atoms, and preferably with 2 to 3 halogen atoms, each halogen atom having an atomic weight of maximally 80 (i.e. an atomic number ranging from 9 to 35), have good drawing power on polyester including cellulose acetate fibers, good fastness to light, of pure blue shades, good wet fastness, and good resistance to burnt gas fumes.

The new, valuable arylated naphthoxidines used in the method according to the invention, and others are obtained by reacting compounds of the formula

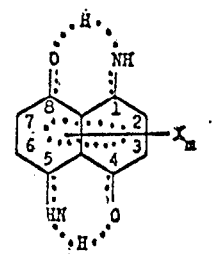

(VI)

X being a substituent as defined above and
m being an integer from 0 to 3 inclusive with aromatic diazonium compounds, the resulting novel compounds, derivatives of the compounds of Formula VI are resonance hybrids, of which Formula VI covers the limit electron configurations, as described by Ernest Merian in "Chemie der Aminonaphthochinone" (Chemia 13, pages 181–212 (1959)), and are referred to in this specification and the appended claims for the sake of brevity as "naphthoxidines." The compounds of Formula VI may be further substituted at the naphthalene nucleus and/or one to three of the hydrogen atoms bound to the naphthalene nucleus, can be substituted as described hereinbefore.

Naphthoxidines which are usable as starting materials in the last-mentioned process can be further substituted at the naphthalene nucleus in the 2-, 3-, 6-, or 7-position and at the nitrogen atoms linked to the 1- and/or 5-position. Halogen atoms and/or lower alkyl groups such as chlorine or, preferably, bromine, lower alkyl groups such as methyl, ethyl, n-propyl, isopropyl groups, can be present as substituents of the naphthalene nucleus.

The substitution of a free hydrogen atom, bound to the naphthalene nucleus of naphthoxidine, by the radicals of a diazonium salt wtih cleavage of the nitrogen of the

group of the latter is very unexpected, for naphthalene derivatives such as 1-hydroxy-amino-naphthalene coupled with diazonium salts with formations of an azo bridge —N=N—.

The naphthoxidines used as starting materials in the said process fail to show the typical quinone reaction of, for instance, benzo- or naphthoquinone. Furthermore, the known arylated benzo- or naphthoquinones are relatively unstable due to their pronounced quinone character and are unsuited for use as dyestuffs.

Ring substituted arylated iminobenzoquinones and iminonaphthoquinones have never been produced prior to the present invention, to the best of our knowledge.

Aromatic diazonium compounds which are suitable as reactants in the process for making the compounds used according to the present invention are those of carbocyclic as well as those of heterocyclic, mono-or bicyclic radicals which retain their aromatic character even in strongly acid solutions, and are of the formula

(VII)

wherein X⁻ is a suitable anion such as Cl⁻, NO₃⁻, SO₄⁼, HCOO⁻ and the like. The nature of the anion is not critical, one of the substituted phenyl radicals defined hereinbefore in Formulas I to V.

The naphthoxidines which may be substituted as defined above, and which are suitable for use in the process for making the compounds to be used according to the invention, are known or can be obtained by methods known per se, for example, from 1,5-dinitronaphthalenes substituted in the 2-, 3-, 6- or 7-position, by partial reduction with sulfur sesquioxide.

In this reaction, from one to two moles, or even an excess over the latter amount, but preferably one mole of diazonium compounds is caused to react with one mole of the starting naphthoxidine at a temperature within the range of —15° and 50° C., whereby an equivalent amount of nitrogen is split off and the aromatic radical corresponding to the diazonium compound enters at a free β-position of the naphthalene nucleus.

More than one, and preferably two diazonium salt radicals R can be introduced into the naphthalene nucleus of the starting naphthoxidines, if the radical R is an active, strongly negatively substituted R and also R with two to five of the halogen substituents of (I)(a) supra.

Compounds used according to the invention having a further substituted naphthalene radical can be obtained by converting by reduction and/or oxidation, β-substituted, in particular halogenated naphthalene compounds having suitable substitutents in at least two β-positions, into naphthoxidines and then reacting these with diazonium compounds. However, unsubstituted naphthoxidines can also be treated by known methods with electrophilically substituting agents and then reacted with aryl diazonium compounds. Finally, the novel naphthoxidines arylated at the naphthalene nucleus by reaction with diazonium compounds can also be modified for example, can be electrophilically substituted and, particularly, halogenated at the naphthalene nucleus; they can also be hydrolyzed at the nitrogen atom.

The conditions for the reaction producing the compounds which are useful according to the invention can be modified within wide margins. Both water or aqueous mineral acid as well as inert organic solvents, preferably those having high solubilizing properties such as dioxan or dimethyl formamide can be used as reaction media. The naphthoxidines can be reacted both in their free form as well as in the form of a metal halide, e.g. metal chloride or metal bromide adduct. Zinc halide adducts, for example the easily isolated zinc chloride double salt of naphthoxidine can be used in an organic solvent; in the preferred method, the aqueous sulfuric acid solution or suspension of the naphthoxidine is used which results from the production of the "naphthazarine intermediate product" (see Merian supra) in the usual way from 1,5-dinitronaphthalene.

The temperature and duration of the reaction depend to a considerable extent on the nature of the diazonium compound used. Generally, active electrophilically substituted diazonium compounds react considerably more quickly than the less active nucleophilically substituted aryl diazonium compounds. As mentioned above, the reaction takes place in a temperature range between —15° and 50° C. and higher, but without causing hydrolization of the desired end products and/or materials. The preferred temperature range is from —5° to +25° C. and even +30° C. and the average duration of the reaction is about 6 to 24 hours. The reaction medium can be strongly acid to weakly alkaline; an acid medium of a pH smaller than 2 is preferred because of its more general applicability to all starting naphthoxidines. In a commercially preferred mode the reaction medium should contain at least about 20% by weight of water. It is also possible, in certain cases, to add the diazonium salt which has been isolated by filtration and optionally dried, to the naphthoxidine starting compound which has been at least partly dissolved in water or in a suitable, inert organic solvent.

The diazonium salt may also be added to the, preferably aqueous, naphthoxidine solution or suspension, in the form of the acid aqueous diazotation solution in which the diazonium salt has been produced in situ.

The reaction products are isolated in the usual way and are purified if necessary by recrystallization or chromatographic adsorption. Further substitution, for example by halogenation or hydrolysis, is performed by known methods.

The aryl naphthoxidines according to the invention are black-blue to green-black glittering crystalline substance which, in a finely distributed suitable preparation with dispersing agents, dye cellulose acetate, wool, synthetic polyamides or polyesters, either without or after an optional further treatment, e.g. halogenation, in violet, blue to green shades.

Storable compositions for the preparation of aqueous dispersions for the disperse dyeing of polyester fibers and foils, consist (a) of dyestuffs which are defined in Formulas I–V and
(b) at least about 20% by weight, of a dispersant which is either naphthalene sulfonic acid-formaldehyde condensation product or lignin sulfonate or a mixture of both.

The aforesaid naphthalene sulfonic acidformaldehyde condensation products are produced from naphthalene sulfonic acid and formaldehyde in a weight ratio of about 10:1 to 14:1 under conventional condensation conditions. Mixtures of these condensation products with lignin sulfonate can be of random proportions. An anion-active wetting agent such as hydrophilic higher alkylbenzene sulfonates wherein alkyl is of about 10 to 18 carbon atoms, can be added in amounts of about 0.1 to 10% calculated on the total weight of the storable composition.

The following, non-limitative, examples further illustrate the invention. Parts are given therein as parts by weight and the temperatures are in degrees centigrade.

EXAMPLE 1

21.8 parts of 1,5-dinitronaphthalene are reduced in the known manner with sulfur sesquioxide in sulfuric acid to naphthoxidine. The sulfur which precipitates is removed from the solution of the reduction product in sulfuric acid by filtration. The filtrate is then slowly poured into water and ice while stirring well.

The aqueous hydrochloric acid solution of the diazonium compound resulting from diazotation of 17.8 parts of 2,4-dichloro-aniline is added dropwise within about 30 minutes to the blue-violet solution or suspension of naphthoxidine obtained as described above. Foaming ensues and nitrogen is split off. The reaction is completed in about 16 hours at 25°. The precipitated crude product is filtered off under suction, washed with water and, to purify the same, it is stirred into about 1000 parts of water and sodium hydroxide solution is added until the pH is about 12 to 13. The suspension is stirred for 2 hours at room temperature and then the precipitate is filtered off. After washing the blue-black residue with water, it is dissolved in 500 parts of boiling ethanol and any undissolved impurities are filtered off from the solution. The alcoholic solution is evaporated to dryness. A glittering, blue-black crystalline powder is obtained which melts at 208–210° on decomposition. In ethanol it dissolves with an intensive pure reddish-blue color. Its composition corresponds to the formula

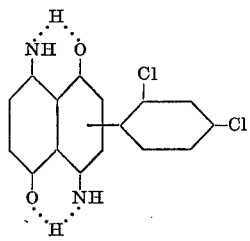

In aqueous dispersion, the substance dyes cellulose di- and tri-acetate and also polyester fibers in reddish-blue shades which have very good wet and light fastness properties.

By using, in the above example, the diazonium compounds from the amines given in the following Table I, which amines are used in amounts which are equimolar to the amine used in the example and otherwise following the same procedure, then correspondingly substituted derivatives are obtained which have similar properties.

TABLE I

| Ex. No. | Amine | Shade of dyeing with corresponding aryl compound on cellulose diacetate |
|---|---|---|
| (2) | 1-amino-3,4-dichlorobenzene | Greenish-blue. |
| (3) | 1-amino-2,5-dichlorobenzene | Do. |
| (4) | 3-aminobenzene-1-N,N-diethyl-sulfonyl | Do. |
| (5) | 4-aminobenzene methylsulfone | Do. |
| (6) | 4-aminobenzoic acid ethyl ester | Reddish-blue. |
| (7) | 1-amino-4-nitrobenzene | Greenish-blue. |
| (8) | 1-amino-3-nitrobenzene | Reddish-blue. |
| (9) | 1-amino-2-nitrobenzene | Do. |
| (10) | 1-amino-2,5-dimethyl-4-nitrobenzene | Blue. |
| (11) | 1-amino-2-chloro-4-nitrobenzene | Greenish-blue. |
| (12) | 1-amino-2-bromo-4-nitrobenzene | Do. |
| (13) | 1-amino-4-chloro-2-nitrobenzene | Do. |
| (14) | 1-amino-2,4-dibromobenzene | Reddish-blue. |
| (15) | 1-amino-2,4-difluorobenzene | Do. |
| (16) | 1-aminophenyl-4-methylketone | Greenish-blue. |
| (17) | 4-amino-diphenylketone | Reddish-blue. |

EXAMPLE 18

21.8 paths of 1,5-dinitronaphthalene are reduced in sulfuric acid with sulfur sesquioxide to naphthoxidine and the solution is diluted with ice water as described in Example 1.

A solution of the diazonium sulfate from 21.6 parts of 2,4,5-trichloro-1-aminobenzene is added dropwise, within about 1 hour while stirring, to the ice cold sulfuric acid aqueous solution of the naphthoxidine. After stirring for 18 hours at 10 to 15° the crude product, which has formed with development of nitrogen, is filtered off and purified as described in Example 1. A blue-black glittering product which dissolved in ethanol with a pure greenish-blue color is obtained. It is obtained in pure form by chromatographic adsorption when it then melts at 196–198° on decomposition.

Elementary analysis corresponds to the formula

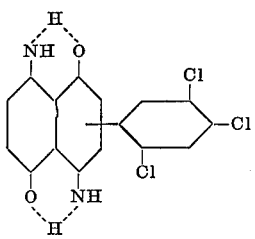

Found (percent): C, 52.25; H, 2.46; Cl, 28.96; N, 7.63.
Calculated (percent) C, 52.21; H, 2.36; Cl, 28.94; N, 7.44.

Dispersed in water in the usual way, the dyestuff produces pure greenish-blue dyeings on acetate silk or polyester fibers. The dyeings are fast to wet and light. The drawing power of the dyestuff is remarkably good.

If, in the above example, instead of the diazonium compound from 21.6 parts of 2,4,5-trichloro-1-aminobenzene, diazonium compounds from corresponding amounts of the amines given in the following Table II are used, and otherwise the same procedure is followed, then blue dyestuffs having similar properties are obtained.

TABLE II

| Ex. No. | Amine | Shade of dyeing with corresponding aryl compound on cellulose diacetate |
|---|---|---|
| (19) | 1-amino-2,3,4-trichlorobenzene | Greenish-blue. |
| (20) | 1-amino-3,4,5-trichlorobenzene | Do. |
| (21) | 1-amino-2,3,4,6-tetrachlorobenzene | Do. |
| (22) | Amino-pentachlorobenzene | Do. |
| (23) | 1-amino-4-chloro-3-trifluoromethylbenzene | Do. |
| (24) | 1-amino-2,5-dichloro-4-nitrobenzene | Do. |
| (25) | 1-amino-2,6-dibromo-4-nitrobenzene | Do. |
| (26) | 1-amino-2,6-dichloro-4-nitrobenzene | Do. |
| (27) | 1-amino-2,4,5-tribromobenzene | Do. |

EXAMPLE 28

21.8 parts of 1,5-dinitronaphthalene are reduced to naphthoxidine in the usual way with sulfur sesquioxide in 185 parts of sulfuric acid. Excess sulfur is removed by filtration of the sulfuric acid solution of the reaction product and the filtrate is diluted with 300 parts of ice while cooling. A diazonium sulfate solution, obtained by diazotisation of 20 parts of 2-nitro-5 aminobenzoic acid-n-butyl ester, dissolved in 90 parts of concentrated sulfuric acid while cooling, is added dropwise to this dilute solution of the naphthoxidine at a temperature of 15 to 20° within about 4 hours. After stirring for another 3 hours, during which time the nitrogen development decreases, the reaction mass is diluted with 1500 parts of ice and water. The precipitated crude product is filtered off, washed with water, dilute sodium carbonate solution and again with water and dried. A difficultly soluble, black impurity is removed by extraction with 500 parts of boiling ethanol. A blue-black glittering dyestuff is obtained which dissolves in ethanol with an intensively pure blue color. It is obtained in pure form by recrystallization or chromatographic adsorption on aluminum oxide, and it corresponds to the formula

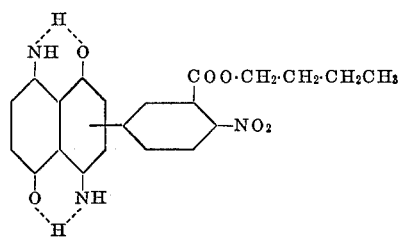

It dyes cellulose acetate and polyester fibers from a suitable aqueous dispersion in pure blue shades which have good fastness properties, in particular very good fastness to sublimation on polyester material.

If in the process described in the above example, a mixture of 200 parts of glacial acetic acid and 70 parts of concentrated hydrochloric acid is used for the diazotisation instead of the 90 parts of sulphuric acid, then a somewhat higher yield of the same dyestuff is obtained.

If in the above example, with otherwise the same procedure, the diazonium compounds from equimolecular amounts of the amines given in the following Table III are used, then correspondingly substituted derivatives having similar properties are obtained.

15.2 parts of bromine are added. The reaction mixture is refluxed for 2 hours. The solution obtained is washed neutral with water and the chloroform is distilled off.

TABLE III

| No. | Amine | Shade of dyeing of corresponding aryl compound on polyester fibers |
|---|---|---|
| (1) | 2-nitro-5-amino-benzoic acid methyl ester | Greenshih-blue. |
| (2) | 2-nitro-5-amino-benzoic acid ethyl ester | Do. |
| (3) | 2-nitro-5-amino-benzoic acid isopropyl ester | Do. |
| (4) | 2-nitro-5-amino-benzoic acid n-amyl ester | Do. |
| (5) | 2-nitro-5-amino-benzoic acid cyclohexyl ester | Do. |
| (6) | 2-nitro-5-amino-benzoic acid ethoxyethyl ester | Do. |
| (7) | 1-amino-2-chloro-4-nitro-benzene | Do. |
| (8) | 1-amino-2-bromo-4-nitro-benzene | Do. |
| (9) | 1-amino-4-bromo-3-nitro-benzene | Do. |
| (10) | 1-amino-2,5-dichloro-4-nitro-benzene | Do. |
| (11) | 4-amino-3-nitrobenzene sulfonic acid diethylamide | Do. |
| (12) | 1-amino-2,4,5-trichlorobenzene | Blue. |
| (13) | 1-amino-2,3,4-trichlorobenzene | Do. |
| (14) | 1-amino-4-chloro-3-trifluoromethyl-benzene | Greenish-blue. |
| (15) | 2-nitro-5-amino-benzoic acid-benzyl ester | Do. |
| (16) | 2-nitro-5-amino-benzoic acid-2-methylbenzyl ester | Do. |
| (17) | 2-nitro-5-amino-benzoic acid-4-chlorobenzyl ester | Do. |
| (18) | 2-nitro-5-amino-benzoic acid-4-bromobenzyl ester | Do. |
| (19) | 2-nitro-5-amino-benzoic acid-4-nitrobenzyl ester | Do. |
| (20) | 4-aminobenzene-sulfonic acid-monoethylamide | Do. |

EXAMPLE 29

10.4 parts of dibromo naphthoxidine, obtained as described in German Pat. No. 841,314, are dissolved in 200 parts of dimethyl formamide. The diazonium chloride solution from 4.94 parts of 4-nitroaniline is added dropwise to the solution within 1 hour at a temperature between 0 and 10°. Nitrogen is developed. After stirring for 6 hours at 5 to 10°, the solution is diluted with water, the product which precipitates is filtered off and washed. It is purified by recrystallization from ethanol. In polar organic solvents the reaction product dissolves with a green-blue color; the color is considerably more green than that of the starting material. As dispersion dyestuff, the new compound dyes synthetic fibers such as cellulose acetate or polyester fibers in very pure green-blue shades of good color strength.

Similar dyestuffs are obtained if, in the above example, the reaction components are replaced by equivalent amounts of the starting materials given in the following Table IV.

The brominated dyestuff, which is obtained in a pure form in the usual way, e.g. by recrystallizing or adsorption on an aluminum oxide column; corresponds to the formula

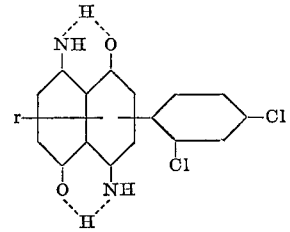

From a suitable aqueous dispersion, it dyes cellulose acetate and polyester fibers in pure blue shades which have very good fastness properties. It has good drawing power.

If in the above example, instead of the 26.8 parts of end product according to Example 1, equivalent amounts

TABLE IV

| No. | Naphthoxidine component | Amine for diazonium component | Arylated product shade of dyeing on polyester |
|---|---|---|---|
| (1) | 3,7-dibromonaphthoxidine | 1-amino-2,4-dichlorobenzene | Greenish-blue. |
| (2) | do | 1-amino-2,4-dibromobenzene | Do. |
| (3) | do | 1-amino-2,4,5-trichloro-benzene | Do. |
| (4) | do | 1-amino-2-chloro-4-nitro-benzene | Green-blue. |
| (5) | do | 1-amino-2,5-dichloro-4-nitrobenzene | Do. |
| (6) | 3-bromo-naphthoxidine | 1-amino-2-chloro-4-nitrobenzene | Greenish-blue. |
| (7) | 2-chloro-naphthoxidine | 1-amino-4-nitrobenzene | Do. |
| (8) | 2,6-dichloro-naphthoxidine | 1-amino-2,4,5-tri-chloro-benzene | Green-blue. |
| (9) | 3,7-dibromo-naphthoxidine | 1-amino-2-bromo-4-nitrobenzene | Do. |
| (10) | do | 3-amino-6-nitrobenzoic acid-n-butylester | Do. |

EXAMPLE 30

26.8 parts of the end product obtained according to Example 1 are dissolved in 300 parts of chloroform and of the arylated naphthoxidine in the following Table VI are used, then dyestuffs having similar properties are obtained.

TABLE VI

Starting material to be brominated

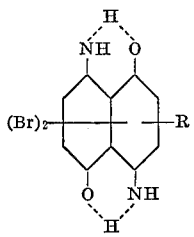

| No. | | Brominated product shade of dyeing on cellulose diacetate |
|---|---|---|
| (1) | 2,4-difluorophenyl | Reddish blue. |
| (2) | 2,5-dichlorophenyl | Do. |
| (3) | 3,4-dichlorophenyl | Greenish blue. |
| (4) | 2,4,5-trichlorophenyl | Do. |
| (5) | 3,4,5-trichlorophenyl | Do. |
| (6) | 2,4-dibromophenyl | Reddish blue. |
| (7) | 2,5-dibromophenyl | Do. |
| (8) | 4-nitrophenyl | Greenish blue. |
| (9) | 2-chloro-4-nitrophenyl | Do. |
| (10) | 4-chloro-2-nitrophenyl | Do. |
| (11) | 2,5-dichloro-4-nitrophenyl | Do. |
| (12) | 2,6-dibromo-4-nitrophenyl | Do. |
| (13) | 4-carboethoxyphenyl | Reddish blue. |
| (14) | 2-bromo-4-nitro-phenyl | Blue-green. |

EXAMPLE 31

If the procedure given in the Example 30 is followed but instead of 15.2 parts, 30.4 parts of bromine are used, then dyestuffs having similar properties and a somewhat more green shade are obtained. Their composition corresponds to the formula:

(structure with (Br)₂ substituent)

Chlorine-containing blue dyestuffs are obtained by the above method if the bromine is replaced by the equivalent amount of sulfuryl chloride.

EXAMPLE 32

2 parts of the dyestuff produced according to Example 12 are dispersed in 4000 parts of water. 12 parts of the sodium salt of o-phenylphenol and 12 parts of diammonium phosphate are added to this dispersion. 100 parts of terephthalic acid polyglycol ester yarn are dyed for 1½ hours at 95–98°. The dyeing is rinsed and after-treated with dilute sodium hydroxide solution and a dispersing agent. In this way a greenish-blue dyeing is obtained which is fast to washing, sublimation and light.

If, in the above example, the 100 parts of polyester yarn are replaced by 100 parts of cellulose triacetate fabric, dyeing is performed under the conditions given and the dyeing is then rinsed with water, then a blue dyeing is obtained which is distinguished by a high degree of wet and light fastness.

EXAMPLE 33

2 parts of the dyestuff obtained according to Example 30 Table VI No. 9 are finely suspended in 2000 parts of water containing 4 parts of a synthetic dispersing agent in a pressure dyeing apparatus. The pH of the dye bath is adjusted to 6.0 to 6.5 with acetic acid. 100 parts of terephthalic acid polyester fabric are introduced at 50°, the bath is heated within 30 minutes to 130° and dyeing is performed for 50 minutes at this temperature. The dyeing is rinsed, soaped and dried. A blue dyeing of pure shade is obtained which is fast to washing, light and very good sublimation.

EXAMPLE 34

2 parts of the dyestuff No. 4 in Table VI (Example 31) are finely suspended in 3000 parts of water containing 6 parts of synthetic dispersing agent. 100 parts of cellulose acetate fabric are introduced at 30–40°, the temperature is raised within 30 minutes to 80° and dyeing is performed at this temperature for 50 minutes. The blue dyeing obtained is rinsed and dried. It has very good fastness to water, washing and light as well as remarkable fastness to industrial fumes, especially burnt gas fumes.

EXAMPLE 35

A storable dyestuff-dispersant mixture is prepared by intimately mixing by grinding together and subsequently atomizing a mixture of (a) 1 part of the dyestuff No. 7 of Table III prepared according to Example 28, 1 to 3 parts of a synthetic dispersing agent, naphthalene sulfonic acid-formaldehyde condensation product containing the aforesaid components in a ratio of 12:1 by weight, (b) 1 part of the dyestuff No. 14 of Table VI, prepared according to Example 31, 1 to 3 parts of lignin sulfonate, sold as Artisol 2.

(c) a mixture of 1 part of the dyestuff No. 9 of Table VI prepared according to Example 31, 1 part of a synthetic dispersing agent, naphthalene sulfonic acid-formaldehyde condensation product containing the aforesaid components in a ratio of 12:1 by weight, 1 part of lignin sulfonate, sold as Artisol 2.

From the above storable compositions, dye-baths for disperse dyeing of polyester fibers can be prepared by adding water and, if desired, a wetting agent.

EXAMPLE 36

A storable dyestuff-dispersant mixture is prepared by intimately mixing by grinding together and subsequently atomizing a mixture of 1 part of the dyestuff of Example 28,
1 to 3 parts of lignin sulfonate, sold as Artisol 2,
0.01 to 0.5 parts of dodecyl benzene sulfonate as wetting agent.

Such storable mixtures as described in Examples 35 and 36 may also be in the form of pastes containing about 1 to 3 parts of water obtained by wet grinding the aforesaid ingredients.

In a similar, storable dystuff dispersant mixtures of equally good properties can be produced with other dyestuffs described in Examples 1–31.

We claim:

1. A process for the production of arylated naphthoxidines, comprising (I) mixing to react with each other at a temperature between $-15°$ and $+50°$ C. in an acid to weakly alkaline medium (a) a naphthoxidine of the formula

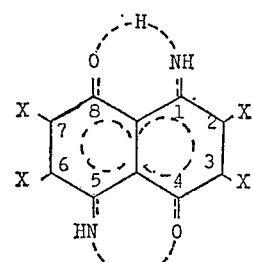

wherein each X represents a member selected from the group consisting of hydrogen, chlorine, bromine, lower alkyl and phenylamino, at least one X being hydrogen and not more than one X being phenylamino, and, per mol thereof, 3,539,597

31

(b) at least one mol of a diazonium salt of the formula

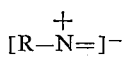
[R—N=]⁻ wherein A⁻ is an anion and R is the radical of a mono-to bicyclic aromatic compound, which radical retains its aromatic electron configuration even in strongly acid medium, and the amino-substituted analog of which is diazotizable, in solvent inert to the reactants and the reaction product;

and recovering the resulting naphthoxidine substituted in at least one β-position of its naphthalene nucleus with said radical R.

2. A process as described in claim 1, wherein the reaction medium has a pH smaller than 2, and contains at least 20% by weight of water.

3. A process as described in claim 1, wherein the temperature of the reaction medium is from about —5° to 30° C.

4. A process as described in claim 1, wherein the solvent is water-diluted sulfuric acid.

5. A process as described in claim 1, wherein the starting naphthoxidine is substituted in β-position at its naphthalene nucleus with from one to three members selected from the group consisting of halogen of an atomic weight of maximally 80, lower alkyl and phenylamino, at least one β-position remaining unsubstituted.

6. A process as described in claim 1, wherein R is a phenyl radical.

7. A process as described in claim 1, wherein from one to two mols of the diazonium salt are added.

8. A process for the production of arylated halogenated naphthoxidine, comprising (I) mixing to react with each other at a temperature between —15° and +50° C. in an acid to weakly alkaline medium
(a) a naphthoxidine of the formula

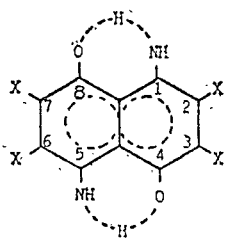

wherein each X represents a member selected from the group consisting of hydrogen, chlorine, bromine, lower alkyl and phenylamino, at least $n+1$ X's being hydrogen and not more than one X being phenylamino, $n$ ranging from 1 to 2, and per mol thereof, (b) about $n$ mols of a diazonium salt of the formula

[R—N=N]A⁻ where A⁻ is an anion and R is the radical of an aromatic compound having from one to two carbocyclic rings, which radical retains its aromatic electron configuration even in strongly acid medium, and the amino-substituted analog of which is diazotizable, in solvent inert to the reactants and the reaction product, (II) adding to the latter a halogenating reactant selected from the group consisting of bromine and sulfurylchloride, thereby halogenating at least one to all of the remaining free β-positions of the arylated naphthoxidine resulting from (I), and (III) recovering the β-arylated, β-halogenated naphthoxidine.

9. A process as described in claim 8, wherein the β-arylated naphthoxidine resulting from step (I) is first

32 isolated from the reaction mixture and then further reacted as defined in step (II).

10. A process for the production of arylated halogenated hemi-naphthazarine or naphthazarine, comprising (I) mixing to react with each other at a temperature between —15° and +50° C. in an acid to weakly alkaline medium
(a) a naphthoxidine of the formula

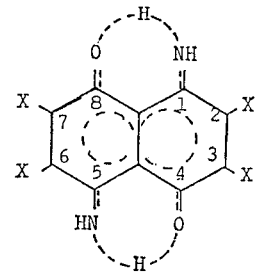

wherein each X represents a member selected from the group consisting of hydrogen, chlorine, bromine, lower alkyl and phenylamino, at least one X being hydrogen and not more than one X being phenylamino, and, per mol thereof, (b) at least one mol of a diazonium salt of the formula

[R—N=N]A⁻ wherein A⁻ is an anion and R is the radical of an aromatic compound having from one to two carbocyclic rings, which radical retains its aromatic electron configuration even in strongly acid medium, and the amino-substituted analog of which is diazotizable, in solvent inert to the reactants and the reaction product, (II) adding to the latter in aqueous medium a hydrolizing agent at 30° to the boiling point of the reaction medium, this temperature depending on the strength and concentration of said hydrolysis agent and the duration of the reaction, thereby converting the β-arylated naphthoxidine to the corresponding β-arylated naphthazarine derivative in which, depending on the acidity of the hydrolysis agent and the applied temperature, from one to both of the two imino groups present in the naphthoxidine nucleus

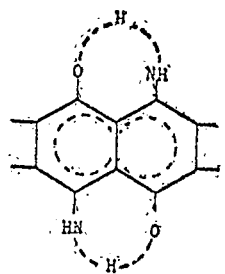

are replaced, depending on the temperature applied, by one to two oxygen atoms.

11. A composition-of-matter of the formula

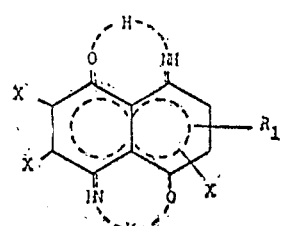

wherein each X is independently a member selected from the group consisting of hydrogen, chlorine, bromine, lower alkyl and phenylamino, not more than one X being phenylamino, and R₁ is an aryl moiety selected from the group consisting of
(a) phenyl substituted with from 0 to 5 halogen atoms, each of which has an atomic weight of maximally 80, and with from 0 to 3 alkyl groups, the total number of carbon atoms of all alkyl substituents of R₁ taken together not exceeding five,
(b) a phenyl radical of the formula

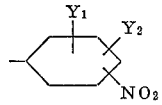

in which formula Y₁ is a member selected from the group consisting of hydrogen, fluorine, chlorine and bromine, and Y₂ is a member selected from the group consisting of hydrogen, chlorine and bromine,
(c) a phenyl radical of the formula

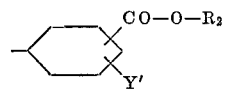

in which formula R₂ is a member selected from the group consisting of alkyl with maximally 6 carbon atoms, alkoxyalkyl with maximally 7 carbon atoms, cyclohexyl, benzyl, methylbenzyl, chlorobenzyl, bromobenzyl, and nitrobenzyl; and Y' is a member selected from the group consisting of hydrogen and nitro;
(d) a phenyl radical of the formula

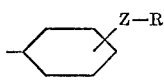

in which formula Z is a member selected from the group consisting of —CO— and —SO₂—; and R₃ is a member selected from the group consisting of lower alkyl, phenyl, chlorophenyl and lower alkylphenyl; and
(e) a phenyl radical of the formula

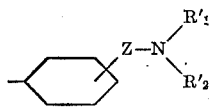

in which formula Z has the same meaning as under (d), R'₁ is a member selected from the group consisting of hydrogen and alkyl with maximally 5 carbon atoms, and R'₂ is a member selected from the group consisting of hydrogen and alkyl with maximally 5 carbon atoms.

12. A composition-of-matter as defined in claim 11, wherein R₁ is an aryl moiety as defined under (a).

13. A composition-of-matter as defined in claim 11, wherein R₁ is an aryl moiety as defined under (b).

14. A composition-of-matter as defined in claim 11, wherein R₁ is an aryl moiety as defined under (c).

15. A composition-of-matter as defined in claim 11, wherein R₁ is an aryl moiety as defined under (d).

16. A composition-of-matter as defined in claim 11, wherein R₁ is an aryl moiety as defined under (e).

17. A composition-of-matter as defined in claim 14, wherein R₁ is the radical of the formula

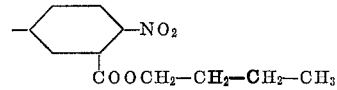

and each X is hydrogen.

18. A composition-of-matter as defined in claim 13, wherein R₁ is the radical of the formula

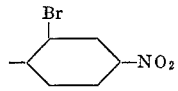

and each X is hydrogen.

19. A composition-of-matter as defined in claim 13, wherein R₁ is the radical of the formula

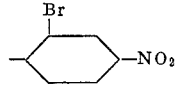

one X is bromine, and each of the remaining two X's is hydrogen.

20. A composition-of-matter as defined in claim 13, wherein R₁ is the radical of the formula

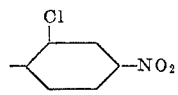

one X is bromine and each of the remaining two X's is hydrogen.

21. A composition-of-matter as defined in claim 12, wherein R₁ is the radical of the formula

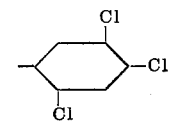

one X is bromine and each of the two remaining X's is hydrogen.

References Cited
UNITED STATES PATENTS
3,422,111  1/1969  Bosshard et al. _____ 260—396

LORRAINE A. WEINBERGER, Primary Examiner

L. A. THAXTON, Assistant Examiner

U.S. Cl. X.R.

8—54, 57; 260—288, 297, 302, 304, 307, 308, 309.2, 309.6, 310.